United States Patent
Geuens

(10) Patent No.: US 8,435,725 B2
(45) Date of Patent: *May 7, 2013

(54) SECURITY LAMINATES WITH INTERLAMINATED TRANSPARENT EMBOSSED POLYMER HOLOGRAM

(75) Inventor: Ingrid Geuens, Emblem (BE)

(73) Assignee: Agfa-Gevaert NV, Mortsel (BE)

( * ) Notice: Subject to any disclaimer, the term of this patent is extended or adjusted under 35 U.S.C. 154(b) by 450 days.

This patent is subject to a terminal disclaimer.

(21) Appl. No.: 12/672,245

(22) PCT Filed: Sep. 19, 2008

(86) PCT No.: PCT/EP2008/062495
§ 371 (c)(1),
(2), (4) Date: Feb. 4, 2010

(87) PCT Pub. No.: WO2009/037330
PCT Pub. Date: Mar. 26, 2009

(65) Prior Publication Data
US 2011/0204616 A1      Aug. 25, 2011

Related U.S. Application Data

(60) Provisional application No. 60/973,930, filed on Sep. 20, 2007.

(30) Foreign Application Priority Data

Sep. 20, 2007 (EP) .................................... 07116829

(51) Int. Cl.
- B32B 3/30 (2006.01)
- B32B 27/14 (2006.01)
- B42D 15/10 (2006.01)
- G03H 1/02 (2006.01)
- C09J 5/02 (2006.01)

(52) U.S. Cl.
USPC ....... 430/321; 430/1; 430/2; 359/3; 264/1.31; 427/162; 427/166; 427/299; 427/356

(58) Field of Classification Search .......................... None
See application file for complete search history.

(56) References Cited

U.S. PATENT DOCUMENTS

| | | | |
|---|---|---|---|
| 3,479,426 A | 11/1969 | De Smedt | |
| 3,578,845 A | 5/1971 | Brooks et al. | |
| 3,867,148 A | 2/1975 | O'Keeffe et al. | |
| 4,082,901 A | 4/1978 | Laridon et al. | |
| 4,096,933 A | 6/1978 | Massa | |
| 4,352,716 A * | 10/1982 | Schaible et al. | 216/78 |
| 4,450,024 A | 5/1984 | Haghiri-Tehrani et al. | |
| 4,480,177 A | 10/1984 | Allen | |
| 4,506,916 A | 3/1985 | Kuhl | |
| 4,544,181 A | 10/1985 | Maurer et al. | |
| 4,552,383 A | 11/1985 | Hoppe et al. | |
| 4,556,628 A * | 12/1985 | Greschner et al. | 430/314 |
| 4,853,300 A | 8/1989 | Pike | |
| 4,856,857 A | 8/1989 | Takeuchi et al. | |
| 4,913,858 A | 4/1990 | Miekka et al. | |
| 5,142,383 A * | 8/1992 | Mallik | 359/2 |
| 5,145,212 A * | 9/1992 | Mallik | 283/86 |
| 5,164,227 A | 11/1992 | Miekka et al. | |
| 5,171,625 A | 12/1992 | Newton | |
| 5,223,081 A | 6/1993 | Doan | |
| 5,527,758 A | 6/1996 | Uyttendaele et al. | |
| 5,589,317 A | 12/1996 | Defieuw et al. | |
| 5,753,352 A | 5/1998 | Vanmaele et al. | |
| 5,804,026 A | 9/1998 | Vogt | |
| 5,863,859 A | 1/1999 | Uytterhoeven et al. | |
| 5,869,140 A | 2/1999 | Blohowiak et al. | |

(Continued)

FOREIGN PATENT DOCUMENTS

| | | | |
|---|---|---|---|
| AU | 42586/89 | * | 4/1989 |
| DE | 38 12 454 A1 | | 10/1989 |
| EP | 0 544 035 A1 | | 6/1993 |
| EP | 0622217 | | 11/1994 |
| EP | 1632362 | | 3/2006 |
| EP | 2 042 576 A1 | | 4/2009 |

(Continued)

OTHER PUBLICATIONS

EP Search Report for EP07116829.8, Aug. 20, 2008, 5 pp.
EP Search Report for EP08172496.5, Feb. 25, 2009, 6 pp.
Int'l Search Report for PCT/EP2008/062501, Jan. 7, 2009, 2 pp.
Int'l Search Report for PCT/EP2008/062512, Jan. 26, 2009, 2 pp.
Int'l Search Report for PCT/EP2009/053905, Jul. 15, 2009, 4 pp.
Int'l Search Report for PCT/EP2009/065882, Feb. 15, 2010, 4 pp.
"Adhesion and Bonding," *Encyclopedia of Polymer and Engineering*, Mark et al., ed., pp. 476-577 (1985).

*Primary Examiner* — Martin Angebranndt
(74) *Attorney, Agent, or Firm* — Leydig, Voit & Mayer, Ltd.

(57) ABSTRACT

A method for interlaminating a transparent embossed hologram, the transparent embossed hologram comprising a support having two sides, at least one of the two sides either itself being embossed or having a layer thereon which is embossed and a layer of a HRI-material contiguous with the embossed side or embossed layer, comprising the steps of: a) conditioning the outermost surface of the layer of inorganic HRI-material with at least one organic liquid; b) drying the outermost surface of the layer of the inorganic HRI-material thereby providing a conditioned outermost surface of the layer of inorganic HRI-material; c) applying an adhesive layer to the conditioned outermost surface; and d) laminating the outermost surface of inorganic HRI-material to an optionally transparent film, wherein the at least one organic liquid is selected from the group consisting of ketones, ethers, heterocyclic ethers, lactams, amides, halo-aliphatic compounds, nitriles and esters; wherein at least one of the support and the film is transparent; and wherein the HRI-material is a material with a refractive index of at least 0.3 higher than that of the embossed material. A laminate obtainable with the above-mentioned methods and an identity document comprising the laminate are also disclosed.

22 Claims, No Drawings

U.S. PATENT DOCUMENTS

| | | |
|---|---|---|
| 6,210,777 B1 | 4/2001 | Vermeulen et al. |
| 6,254,971 B1 | 7/2001 | Katayose et al. |
| 6,283,378 B1 | 9/2001 | Welling |
| 6,514,367 B1 | 2/2003 | Leighton |
| RE38,321 E | 11/2003 | Uyama et al. |
| 6,803,114 B1 | 10/2004 | Vere et al. |
| 7,097,899 B2 | 8/2006 | Daems et al. |
| 2001/0016426 A1 | 8/2001 | Lee et al. |
| 2002/0136582 A1 | 9/2002 | Verdyck |
| 2003/0068491 A1* | 4/2003 | Otaki et al. ............... 428/343 |
| 2003/0075275 A1 | 4/2003 | Kubota |
| 2003/0183695 A1 | 10/2003 | Labrec et al. |
| 2004/0180520 A1* | 9/2004 | Janke ....................... 438/573 |
| 2006/0127623 A1 | 6/2006 | Ishida |
| 2006/0193021 A1 | 8/2006 | Ishimoto et al. |
| 2006/0216872 A1* | 9/2006 | Arai et al. ................. 438/149 |
| 2007/0017647 A1 | 1/2007 | Habik et al. |
| 2007/0026585 A1* | 2/2007 | Wong et al. ............... 438/151 |
| 2010/0201115 A1* | 8/2010 | Geuens ...................... 283/94 |
| 2011/0204616 A1 | 8/2011 | Geuens |
| 2011/0266788 A1* | 11/2011 | Geuens ..................... 283/109 |

FOREIGN PATENT DOCUMENTS

| | | |
|---|---|---|
| GB | 1439478 | 6/1976 |
| GB | 2132136 | 7/1984 |
| GB | 2279610 | 1/1995 |
| GB | 2338678 | 12/1999 |
| GB | 2400074 | 10/2004 |
| JP | 58-172679 * | 10/1983 |
| JP | 63-215732 | 9/1988 |
| JP | 03-270993 | 12/1991 |
| JP | 04-123191 | 4/1992 |
| JP | 07-089225 * | 4/1995 |
| JP | 08-300810 | 11/1996 |
| JP | 10-119163 | 5/1998 |
| JP | 00-085282 | 3/2000 |
| JP | 00-251108 | 9/2000 |
| JP | 05-293396 | 10/2005 |
| JP | 07-268712 | 10/2007 |
| WO | WO 99/24934 | 5/1999 |
| WO | WO 99/51446 | 10/1999 |
| WO | WO 00/18591 | 4/2000 |
| WO | WO 03/055638 | 7/2003 |
| WO | WO 2007/023410 | 3/2007 |
| WO | WO 2007/027619 A2 | 3/2007 |
| WO | WO 2007/132214 | 11/2007 |
| WO | WO 2008/084315 | 7/2008 |
| WO | WO 2009/037330 A1 | 3/2009 |

\* cited by examiner

SECURITY LAMINATES WITH INTERLAMINATED TRANSPARENT EMBOSSED POLYMER HOLOGRAM

FIELD OF INVENTION

This invention relates to security laminates with interlaminated transparent embossed polymer hologram with an inorganic HRI-material-coating and a method for realizing same.

BACKGROUND OF THE INVENTION

Security laminates are traditionally used to protect documents or packages to ensure that the underlying items are not altered by containing an authentification feature making them difficult to counterfeit. Security laminates are particularly useful on identification cards such as driver's licenses, ID-cards and passports, and on other important documents such as certificates of title. Security laminates are also useful as tamper proof seals on medications, video cassettes, and compact discs. Five features are particularly important when producing and using security laminates. First, once applied to an article it is important that the laminate is difficult to remove to ensure that the underlying item is not altered or subjected to tampering. Second, a desirable laminate is difficult if not impossible to duplicate by counterfeiters. Third, if tampering occurs it is important to quickly and accurately recognize an altered or counterfeit laminate. Fourth, it is important that manufacturing costs of the laminates are not prohibitively expensive. Fifth, when used on articles such as identification cards, it is important that the laminate has sufficient durability to withstand harsh treatment.

Holograms have, due to the difficulty in making and reproducing them, become a common authentication feature on items like credit cards, driver's licenses and access cards. Holograms have also been used as security features on high end products, making it harder to counterfeit these products.

A major advance in display holography occurred in 1968 when A. Benton invented white-light transmission holography. This type of hologram can be viewed in ordinary white light creating a "rainbow" image from the seven colours which make up white light. Benton's invention made mass production of holograms possible using an embossing technique. With this technique holographic information is transferred from light sensitive glass plates to nickel embossing shims. The holographic images are "printed" by stamping the interference pattern onto plastic. The resulting hologram can be duplicated millions of times inexpensively, although master-shim rolls will need to be regularly replaced. Therefore, embossed holograms are now being used by the publishing, advertising, banking and security industries. The difficulty in making and reproducing holograms has made them a common authentication feature on security items such as credit cards, driver's licenses and access (identification) cards. Transparent holograms are often used for security applications such as identification or access cards, where it is desired that information positioned behind the hologram remains visible to the unaided eye.

The most common method of creating a hologram is to create a grating pattern in a surface so that particular structures become visible upon diffraction of light in the grating. U.S. Pat. No. 3,578,845 describes how diffraction gratings are typically generated. Typically, the diffraction patterns are embossed into a thermo-formable substrate such as an embossable polymer film. This process is performed by pressing a heated stamp made from a hard material to engrave the desired grating from the contact surface of the stamp onto the embossable substrate.

Diffraction requires that the medium the grating is made of and the media bordering the grating have a difference in refractive index index. The larger this difference, the brighter the diffraction will appear. To create the highest diffraction in transparent holograms, the grating is coated with a thin film of transparent material having a high refractive index (HRI).

While the grating can be embossed into the substrate material with a stamp, a more common, economical method, is the use of continuous embossing systems. Such embossing systems are described for example in U.S. Pat. Nos. 4,913,858 and 5,164,227. In these methods the grating structure is engraved into the surface of a roll, which continuously presses its surface pattern into the web type substrate passing between the embossing roll and a backside roll. In order to obtain the grating in the substrate's surface, the thermo-formable layer on this surface is heated. This can be achieved either by preheating the substrate to the required temperature, or by heating the embossing roll.

WO 2007/027619A2 discloses a translucent holographic film comprising: an adhesive layer; an embossed layer, the embossed layer including an embossed side defining ridges having peaks pointing toward the adhesive layer.

Transparent holograms are commonly produced by using vacuum evaporation techniques to coat an embossed polymer with a transparent HRI-coating. Moreover, to prevent tampering the resulting hologram is often embedded by lamination within multiplex identity documents. This requires that not only the support/base of the hologram adhere to a contiguous film or layer within the multiplex system making up the identity document, but also that outermost surface of the HRI-layer also adhere to a contiguous film or layer within the multiplex system making up the identity document.

Moreover, adhesion of the outermost surface of the HRI-layer to a contiguous film, layer or card should occur without substantial loss of the brilliance of the hologram to prevent loss of contrast.

Commercially available transparent embossed holograms coated with an inorganic HRI-material do not lend themselves to tamper-proof interlamination in the multiplex system making up a multiplex identity document.

ASPECTS OF THE INVENTION

It is therefore an aspect of the present invention to provide a tamper-proof means of laminating a transparent embossed polymer hologram coated with an inorganic HRI-material within the multiplex system making up an identity document without substantial loss of brilliance.

It is therefore a further aspect of the present invention to provide a multiplex identity document comprising an interlaminated tamper-proof embossed polymer hologram coated with an inorganic HRI-material.

Further aspects of the present invention will become apparent from the description hereinafter.

SUMMARY OF THE INVENTION

Commercially available transparent embossed holograms coated with an inorganic HRI-material do not lend themselves to tamper-proof interlamination in the multiplex system making up a multiplex identity document. Typically such embossed holograms are produced by coating an embossable polymer layer on a support followed by locally embossing the layer and vacuum evaporation of a HRI-layer over the whole surface of the embossable polymer layer. Using standard adhesives it was found impossible to obtain sufficient adhesion of the outermost surface of the HRI-layer, e.g. a ZnS— or $TiO_2$-layer, to a polyethylene film to avoid integral delamination. Surprisingly it has been found that treatment of the outermost surface of the inorganic HRI-layer of commercially available transparent embossed holograms coated with an inorganic HRI-material with certain organic liquids so conditioned the outermost surface of the inorganic HRI-material that good adhesion could be realized to a polyethylene, polyethylene terephthalate, PET, PVC or polycarbonate film using adhesives. Furthermore, the combined use of such organic liquid with particular adhesives at sufficiently low concentrations enabled good adhesion to be realized thereby reducing the number of process steps required to realize interlamination. This improvement in adhesion was realized at the expense of brilliance indicating a roughening of the surface, but masking or partial coverage with a protective water-releasable/soluble film enabled this problem to be overcome by obtaining adhesion adjacent to the protected areas.

Aspects of the present invention have been realized by a method for interlaminating a transparent embossed hologram as described herein.

Aspects of the present invention have also been realized by a security laminate obtainable by the above-mentioned methods.

Aspects of the present invention have also been realized by an identity document comprising the above-mentioned security laminate.

Preferred embodiments are disclosed in the dependent claims.

DETAILED DESCRIPTION OF THE INVENTION

Definitions

Commonly the art differentiates between "Soft Embossing" and "Hard Embossing". Soft Embossing describes the process where the embossing is performed before a high reflective index (HRI) layer is applied. "Hard Embossing" is performed by creating the grating through the HRI layer. While Hard Embossing is done on substrates coated with "soft" metals like aluminum, copper or gold, it is not typically done through semi-transparent reflection enhancement HRI layers like ZnS or $TiO_2$.

The term interlamination, as used in disclosing the present invention, means the lamination of a foil, label or other substantially flat object between two films.

The term film, as used in disclosing the present invention, means a self-supporting polymer-based sheet, which may vary in thickness from several microns thick, e.g. the foils used in thermal sublimation printing (TSP) and in the production of multiplex identification documents, to several mm thick.

The term transparent hologram, as used in disclosing the present invention, means a hologram contiguous with a transparent HRI-material.

The term non-transparent hologram, as used in disclosing the present invention, means a hologram contiguous with a non-transparent HRI-material e.g. a metal.

The term high refractive index (HRI) material, as used in disclosing the present invention, means a material with a refractive index of at least 0.3 higher than that of the embossed material and preferably at least 0.6 higher than that of the embossed material.

Method for Interlaminating a Transparent Embossed Hologram

Aspects of the present invention have been realized by a method for interlaminating a transparent embossed hologram, said transparent embossed hologram comprising an optionally transparent support having two sides, at least one of the two sides either itself being embossed or having a layer thereon which is embossed and a layer of a HRI-material contiguous with the embossed side or embossed layer, comprising the steps of: conditioning the outermost surface of the layer of inorganic HRI-material with at least one organic liquid; drying the outermost surface of the layer of the inorganic HRI-material thereby providing a conditioned outermost surface of the layer of inorganic HRI-material; applying an adhesive layer to the conditioned outermost surface; and laminating the outermost surface of inorganic HRI-material to an optionally transparent film, wherein the at least one organic liquid is selected from the group consisting of ketones, ethers, heterocyclic ethers, lactams, amides, haloaliphatic compounds, nitriles and esters and wherein at least one of the support and the film is transparent.

The conditioning of the outermost surface of the HRI-layer with solvent can be realized using coating techniques or printing techniques such as gravure and screen printing followed by drying.

In one embodiment of the methods according to the present invention, the embossed layer has a refractive index within 0.2 of the refractive index of the support.

In a preferred embodiment of the method according to the present invention, the polymer film laminated to the outermost surface of the layer of HRI-material is a polymer foil preferably having a thickness between about 5 µm and about 120 µm, more preferably between about 10 µm and about 60 µm, most preferably between about 10 µm and about 30 µm.

In an embodiment of the methods according to the present invention, the peel strength of the HRI-layer is at least 6 N/cm as measured according to ISO Norm 10373-1-1978. If the foil breaks during the peel strength test the peel strength is above the measurable range of peel strength values.

In an embodiment of the methods according to the present invention, the lamination of the transparent foil to the outermost surface of the HRI-layer has a peel strength of at least 6 N/cm as measured according to ISO Norm 10373-1-1978. If the foil breaks during the peel strength test the peel strength is above the measurable range of peel strength values.

In an embodiment of the methods according to the present invention, the method further comprises the steps of: applying an adhesive layer to the outermost surface on the side of the support with the HRI-layer not above the embossed layer and laminating the transparent film to the adhesive layer so that the adhesive at least provides a seal round the transparent embossed hologram or holograms.

In an embodiment of the methods according to the present invention, the lamination of the support to the polymer film has a peel strength of at least 6 N/cm as measured according to ISO Norm 10373-1-1978. If the polymer film breaks during the peel strength test the peel strength is above the measurable range of peel strength values.

In an embodiment of the methods according to the present invention, the lamination of the conditional outermost layer to the polymer film has a peel strength of at least 6 N/cm as measured according to ISO Norm 10373-1-1978. If the polymer film breaks during the peel strength test the peel strength is above the measurable range of peel strength values.

In an embodiment of the methods according to the present invention, the support is transparent.

In an embodiment of the methods according to the present invention, the support has a border and the high refractive index material optionally present as a pattern is located inside of the border. The moisture driven corrosion of the high refractive index materials typically starts from the edges of the laminated sheet. An area without the corrosion sensitive high refractive index coating at the edges of the laminate provides an improved moisture barrier and reduces the corrosion and degradation of the high refractive index material.

In an embodiment of the methods according to the present invention, the transparent embossed hologram further comprises a base layer and an adhesive layer that binds the base layer to the support.

In an embodiment of the methods according to the present invention, a surface of the support is embossed with a uniform grating, commonly referred to as a "rainbow" grating, and the transparent high refractive index material is applied in a defined pattern on top of the grating. With this embodiment subsequent processing, such as application of a heat or pressure sensitive adhesive, covers the complete areas including those areas that are coated with the high refractive index coating and those areas that are not coated with a high refractive index coating. The refractive index of the adhesive is preferably about the same as the embossed substrate, which causes the elimination of the diffractive effect in those areas that are not coated with a high refractive index coating.

In an embodiment of the methods according to the present invention, the embossed layer or embossed support is surface treated. The surface treatment activates a side of the hologram for the deposition of the transparent HRI layer. Exposing the surface of the embossable multi-layer film to an ionized gas, i.e. plasma, or a corona discharge is a preferable surface treatment.

In an embodiment of the methods according to the present invention, the embossing is performed prior to vacuum coating thereby exposing the layer or surface of the support to the additional heat and pressure of the embossing process resulting is greater removal of entrapped moisture and solvents.

Embossable Layer

Preferably, the embossable layer is made from a low crystalline polymer of the same kind as the support. Preferably, the embossable layer is made from a polymer that has a melting point that is at least about 10° C., but preferably at least about 20° C., lower than the associated polymer of the support.

The thickness of the embossable layer is preferably between about 1 µm and about 10 µm, more preferably between about 2 µm and about 8 µm, most preferable between about 3 µm and about 7 µm. A layer that is too thin can result in poor embossed image quality. A layer that is too thick is inefficient.

Suitable polymers for the embossable low crystalline layer include polyethylene terephthalate (PET), polyvinyl chloride, polyvinylidene chloride, polyethylene, polypropylene, polycarbonate, cellophane, acetate, nylon, polyvinyl alcohol, polyamide, polyamide-imide, ethylene-vinyl alcohol copolymer, polymethyl methacrylate, polyether sulfone, or polyether ether ketone and mixtures thereof.

Preferably, the embossable layer includes a low crystalline variation of the polymer of the substrate film selected from the following group of polymers: polyethylene terephthalate (PET), polyvinyl chloride, polyvinylidene chloride, polyethylene, polypropylene, polycarbonate, cellophane, acetate, nylon, polyvinyl alcohol, polyamide, polyamide-imide, ethylene-vinyl alcohol copolymer, polymethyl methacrylate, polyether sulfone, or polyether ether ketone. The low crystalline polymer becomes pliable at a lower temperature than the core polymer.

A common process for producing an embossable layer, such as an embossable poly(ethylene terephthalate) (PET) or polypropylene (PP), onto the support is to apply a thermoformable embossable coating onto at least one surface of the support. This process is done off-line, i.e. after manufacturing the support. Embossable coatings typically are applied either as a water-based or as a solvent-based solution using coating systems well known in the art such as roll coating, gravure coating, air knife coating and rod coating.

Embossing is performed by pressing a shim with the desired grating embedded in its surface onto the embossable substrate, with the HRI coating and the embossable layer facing the embossing shim. For the embossing process the film can either be preheated to allow the embossable layer polymer to be pliable under the embossing shim, or the shim itself is heated and transfers the heat into the embossable layer making it pliable.

Support

Suitable supports are any polymer film. Preferred support films include polyethylene terephthalate (PET), polyvinyl chloride, polyvinylidene chloride, polyethylene, polypropylene, polycarbonate, cellophane, acetate, nylon, polyamide, polyamide-imide, polymethyl methacrylate, polyether sulfone, and polyether ether ketone films.

The support should be sufficiently thick to be self-supporting, but thin enough to be flexed, folded or creased without cracking. Preferably, the base substrate film has a thickness of between about 7 µm and about 120 µm, more preferably between about 10 µm and about 60 µm, most preferably between about 10 µm and about 30 µm.

Inorganic HRI-Materials

A transparent inorganic HRI coating is applied on top of the embossable surface or layer. In order to achieve sufficient reflectivity, the difference in refractive index between the embossed material and the HRI coating is preferably at least 0.3, more preferably more than 0.6.

In a preferred embodiment, the refractive index of the HRI material is at least 2.0, more preferably at least 2.2.

Suitable transparent high refractive index (HRI)-materials include zinc sulphide (ZnS), antimony(III) sulphide, iron(III) oxide ($Fe_2O_3$), lead(II) oxide (PbO), zinc selenide (ZnSe), cadmium sulfide (CdS), titanium dioxide ($TiO_2$), lead(II) chloride ($PbCl_2$), cerium(IV) oxide ($CeO_2$), tantalum oxide ($Ta_2O_5$), zinc oxide (ZnO), cadmium oxide (CdO), neodymium oxide ($Nd_2O_3$) and aluminium oxide ($Al_2O_3$). Currently, the use of ZnS as a transparent reflection enhancement layer in transparent holograms is the most widely used technology. Mixtures of materials are used as well. U.S. Pat. No. 5,513,019 discloses mixtures of zinc sulphide (ZnS) and tungsten-oxide ($WO_3$) for holograms.

The transparent inorganic HRI-material can be deposited on the layer or support surface in which the embossing with a holographic shim has or will take place by standard deposition techniques such as evaporation, reactive or non-reactive vacuum vapour deposition, physical vapour deposition (PVD), chemical vapour deposition (CVD), sputtering, electron beam deposition and ion beam assisted deposition.

The thickness of the transparent HRI coating is preferably thick enough to provide good refractive properties (refract light) but not so thick as to inhibit its transparent properties.

Preferably, the transparent HRI-material is deposited with a thickness of about 20 to about 250 nm with a thickness of about 5 to about 150 nm being particularly preferred, a thickness of about 5 to about 100 nm being especially preferred and a thickness of 10 nm to 80 nm being most especially preferred. In the case of embossing prior to deposition, the deposited HRI-material follows the profile of the embossing.

In vapour deposition techniques, the coating material is evaporated at low pressure, typically in the $1\times10^{-3}$ Pa region, at elevated temperature. By passing the substrate through the vapour, the evaporated material condenses on the embossed substrate surface creating a thin layer of reflection enhancing material. The thickness of the deposited layer depends on several factors, for example, evaporation rate, vapour pressure and dwell time of the substrate in the vapour cloud.

The deposition technique can result in loss of stoichiometry resulting in reduction of the refractive index difference on which the effect is based, loss of transparency and loss of brilliance.

Zinc Sulphide tends to be a soft porous coating but can be deposited at metallizing speeds (100's m/min). Moreover, the ZnS can be thermally evaporated from a slot source that spans the whole web width. Furthermore, the ZnS can dissociate and recombine easily and so stoichiometry is generally not an issue. It is also possible to emboss into the polymer through the ZnS and still obtain a good hologram and ZnS has the advantage that the wear on the holographic shims is less than harder materials such as titanium dioxide. Operators may not be so happy with the material as it can smell when the system is vented because of the residual sulphur.

Titanium dioxide tends to be denser, harder and is usually deposited by slower techniques (1-10's m/min). If a hard wearing, highest quality hologram is required then titanium dioxide will probably be the preferred material. Part of the problem of depositing titanium dioxide is getting the stoichiometry right. Sputtering from a titanium target and reacting the coating with oxygen to produce titanium dioxide is not necessarily easy. The oxygen cannot be controlled selectively to reach the growing coating and not the sputtering cathode and so the cathode gets poisoned. The sputtering rate of titanium dioxide is 20 times slower than for the metal and so the process tends to avalanche to sputtering slowly from an oxide target. There are methods of correcting for this runaway process but they all push up the deposition costs. Ideally if the coating is to be deposited by sputtering a dual cathode with an AC power supply including arc control would be preferred. It is possible to deposit titanium dioxide from electron beam deposition sources but getting a consistent stoichiometry is not trivial. Often an additional oxygen plasma is used both to densify the coating to make it more like a sputtered coating but also as a method of reducing the excess oxygen that is required to convert the metal to titanium dioxide.

Uniformity of the HRI-coating can also be an issue. Sputtering has a deposition rate fall off towards the ends of the cathode so that to get high uniformity across the whole web width requires a cathode length wider than the web width. For electron beam sources it depends on whether you have a series of individual sources that have their deposition flux integrated across the width or whether there is a single sweeping electron beam with a single crucible that spans the web width.

Critical to all vacuum deposition techniques is the position of the pumping system in the system and the method of feeding in the oxygen gas. Ideally the pumping will be symmetric about the web centreline (including any cryopumps) if this is not the case there are additional problems in achieving uniformity. Moisture from the webs can be a source of oxygen to the coating as well as the oxygen added to control the process. If there is asymmetric pumping then there will be a pressure gradient across the web and it then becomes difficult to deliver sufficient oxygen, and no more, to all parts of the sputtering cathode or vapour flux from the e-beam source. Any imbalance will lead to non-stoichiometric coatings.

Plasma post treatment can be used to clean the outermost HRI-layer surface to remove surface contamination. The choice of power, time and gas composition can all affect the effectiveness of any plasma treatment. Argon plasma can roughen the surface and sputter efficiently but there is no mechanism for converting any hydrocarbons into gaseous species that can be pumped away and hence whatever is sputtered from the surface may well fall back and still be a contaminant on the surface even though it has been plasma treated. Thus plasma treatment with an oxygen/argon mixture is often preferred. However, if the surface is over-treated a weak boundary layer on the surface will result due to too much polymer chain scission.

Organic Liquids

The at least one organic liquid used in the processes, according to the present invention, is selected from the group consisting of ketones, ethers, heterocyclic ethers, lactams, amides, halo-aliphatic compounds, nitriles and esters.

Suitable ketones include acetone, methyl ethyl ketone and cyclohexanone.

Suitable ethers include diglyme (2-methoxyethyl ether), tetrahydrofuran and dioxane.

Suitable heterocyclic ethers include tetrahydrofuran and dioxane.

Suitable lactams include 2-pyrrolidinone, N-methyl-2-pyrrolidinone and caprolactam.

Suitable amides include formamide, acetamide, N-methyl formamide and diethyl acetamide.

Suitable halo-aliphatic compounds include chloro-aliphatic compounds, bromo-aliphatic compounds, fluoro-aliphatic compounds, chloro-bromo-aliphatic compounds and chloro-fluoro-aliphatic compounds.

Suitable chloro-aliphatic compounds include methylene chloride, chloroform, dichloroethanes, trichloroethanes, tetrachloroethane and trichloroethylene.

Suitable nitriles include acetonitrile and butyronitrile.

Suitable esters include aliphatic esters, aromatic esters and heterocylic esters.

Suitable aliphatic esters include methyl acetate, ethyl acetate, propyl acetate and butyl acetate.

Suitable aromatic esters include methyl benzoate, ethyl benzoate dimethyl phthalates, diethyl phthalates, dibutyl phthalates and di-(2-ethylhexyl)phthalates.

Suitable heterocyclic esters include γ-butyrolactone, β-butyrolactone, γ-caprolactone and ε-caprolactone.

Adhesives

The adhesive composition used to apply the adhesive layer in the methods according to the present invention comprises a polymer having a plurality of hydroxyl-groups and a curing agent selected from the group consisting of polyisocyanates, polyepoxides and hydrolysed polyalkoxysilanes e.g. tetraalkyl orthosilicates.

In an embodiment of the methods according to the present invention, the adhesive is an adhesive which self-cures ionically.

In an embodiment of the methods according to the present invention, the adhesive is an adhesive which cures thermally.

In an embodiment of the methods according to the present invention, the adhesive is an adhesive which self-cures via the release of water.

In an embodiment of the methods according to the present invention, the adhesive is an adhesive which self-cures under ambient conditions.

In an embodiment of the methods according to the present invention, the adhesive is an adhesive which self-cures at temperatures below 100° C., preferably below 80° C. and particularly preferably below 50° C.

Suitable polymers having a plurality of hydroxyl-groups include hydroxyl urethane prepolymers, polyvinyl alcohol, partially hydrolyzed polyvinyl acetate and gelatin.

Suitable polyisocyanate compounds include aromatic and aliphatic polyisocyanates or polycyanate precursors, see section disclosing polyisocyanates and polyisocyanate precursors.

The curing reaction is mainly based on the reaction between the isocyanate groups or the thermo-generated isocyanate groups and the free hydroxyl groups of the polymers comprising a plurality of hydroxyl-groups, but is also based on the formation of allophanate groups in a reaction of already formed urethane groups in the resin with isocyanate groups of the polyisocyanate [D. H. Solomon "The Chemistry of Organic Film Formers"—John Wiley & Sons, Inc. New York, (1967) p. 203].

Suitable polyalkoxysilanes include tetra-alkyl orthosilicates such as tetramethyl orthosilicate and tetraethyl orthosilicate.

Suitable ingredients for polyurethane adhesives are:

Liofol UK 3640=a polyurethane solvent (ethyl acetate) adhesive from Henkel

Liofol UK 6800=a hardener from Henkel for use with Liofol UK 3640

Liofol UR 7750=a polyurethane prepolymer with isocyanate groups from Henkel

Liofol UR 6071=a hydroxyl hardener from Henkel for use with Liofol UR 7750

Liofol UR 7780=a polyurethane prepolymer with isocyanate groups from Henkel

Liofol UR 6080=a hardener from Henkel for use with Liofol UR 7780

Polyisocyanates

Polyisocyanate crosslinking agents capable of use in the adhesives used in the process of the present invention are aliphatic polyisocyanates, such as hexa-methylene diisocyanate derivatives (HDI) including hexamethylene diisocyanate derivatives (HDI), cyclohexane diisocyanate (CHDI) and isophorondiisocyanate (IPDI); and aromatic polyisocyanates, such as 4,4'-diisocyanatodiphenyl-methane (MDI), 2,4-toluene diisocyanate (2,4-TDI), 2,6-toluene diisocyanate (2,6-TDI) and toluene(2,4/2,6)-diisocyanate derivatives (TDI), naphthylene 1,5-diisocyanate (NDI), p-phenylene diisocyanate (PPDI), triphenyl-methane triisocyanate (e.g. DESMODUR™ R), triphenylmethane-p,p',p"-trityl triisocyanate and thiophosphoric acid tris(p-isocyanatophenyl ester).

Suitable polyisocyanates available from BAYER MATERIAL SCIENCE include:

| | |
|---|---|
| DESMODUR H | monomeric aliphatic diisocyanate based on hexamethylene diisocyanate (HDI) |
| DESMODUR HL BA | aliphatic/aromatic polyisocyanate copolymer based on toluene diisocyanate (TDI) and hexamethylene diisocyanate (HDI) |
| DESMODUR I | monomeric cycloaliphatic diisocyanate copolymer based on IPDI |
| DESMODUR IL | a TDI-isocyanurate |
| DESMODUR IL BA | aromatic polyisocyanate based on toluene diisocyanate (TDI) |
| DESMODUR IL 1351 | a TDI-isocyanurate |
| DESMODUR IL 1451 | aromatic polyisocyanate based on toluene diisocyanate (TDI); for two-pack polyurethane coatings |
| DESMODUR L 67 BA | aromatic polyisocyanate based on toluene diisocyanate (TDI) |
| DESMODUR L 67 MPA/X | aromatic polyisocyanate based on toluene diisocyanate (TDI) |
| DESMODUR L 75 | aromatic polyisocyanate, which is a 75% solution of a reaction product of toluene diisocyanate (TDI) and trimethylolpropane |
| DESMODUR N 75 BA | aliphatic polyisocyanate resin based on hexamethylene diisocyanate (HDI); a 75% solution of a biuret HDI |
| DESMODUR N 75 BA/X | aliphatic polyisocyanate resin based on hexamethylene diisocyanate (HDI); a 75% solution of a HDI biuret |
| DESMODUR N 100 | solvent-free aliphatic polyisocyanate resin based on hexamethylene diisocyanate (HDI); HDI biuret |
| DESMODUR N 300 | an HDI isocyanurate |
| DESMODUR N 3200 | solvent-free aliphatic polyisocyanate resin based on hexamethylene diisocyanate (HDI); HDI biuret with a lower viscosity than DESMODUR N100 |
| DESMODUR N 3300A | solvent-free aliphatic polyisocyanate resin based on hexamethylene diisocyanate (HDI); HDI trimer |
| DESMODUR N 3390A BA/SN | aliphatic polyisocyanate resin based on hexamethylene diisocyanate (HDI); HDI trimer; a 90% solution of an HDI isocyanurate |
| DESMODUR N 3400 | solvent-free aliphatic polyisocyanate resin based on hexamethylene diisocyanate (HDI); low-viscosity HDI trimer |
| DESMODUR N 3600 | solvent-free polyfunctional aliphatic polyisocyanate resin based on hexamethylene diisocyanate (HDI); low-viscosity HDI trimer |

| | |
|---|---|
| DESMODUR N 3790 BA | aliphatic polyisocyanate resin based on hexamethylene diisocyanate (HDI); HDI trimer |
| DESMODUR N 3800 | solvent-free, flexibilizing aliphatic polyisocyanate resin based on hexamethylene diisocyanate (HDI); HDI trimer |
| DESMODUR NZ 1 | solvent-free aliphatic polyisocyanate resin based on hexamethylene diisocyanate (HDI) and isophorone diisocyanate (IPDI) |
| DESMODUR VL | aromatic polyisocyanate based on diphenylmethane diisocyanate (MDI) |
| DESMODUR W | liquid cycloaliphatic diisocyanate |
| DESMODUR XO 672 | solvent-free aromatic polyisocyanate based on 4,4'-diphenylmethane diisocyanate (MDI); water-dispersible crosslinker for aqueous polymeric dispersions, such as polyurethanes, polyvinyl acetate and its copolymers, polychloroprene, reactive acrylics and others |
| DESMODUR XP 2410 | (developmental product) low-viscosity HDI trimer; aliphatic polyisocyanate resin based on hexamethylene diisocyanate (HDI) |
| DESMODUR XP 2580 | (developmental product) aliphatic polyisocyanate based on hexamethylene diisocyanate (HDI) |
| DESMODUR XP 2619 | aromatic isocyanate based on diphenylmethane diisocyanate (MDI); for solvent-free, two-pack polyurethane coatings |
| DESMODUR XP 7144 | aromatic polyisocyanate prepolymer based on diphenylmethane diisocyanate (MDI); for 1K and 2K polyurethane coatings and sealants |
| DESMODUR Z 4470 BA | aliphatic polyisocyanate based on isophorone diisocyanate (IPDI) |
| DESMODUR Z 4470 MPA/X | aliphatic polyisocyanate based on isophorone diisocyanate (IPDI) |
| DESMODUR Z 4470 SN | aliphatic polyisocyanate based on isophorone diisocyanate (IPDI) |
| DESMODUR Z 4470 SN/BA | aliphatic polyisocyanate based on isophorone diisocyanate (IPDI) |

Polyisocyanate Precursors

Polyisocyanate precursors such as polyisocyanates with a blocking group to prevent reaction at room temperature which upon unblocking react with the polyhydroxy binders and polyhydroxy binders may be used in the adhesives used in the process and laminate according to the present invention.

Polyisocyanates are thermally reversibly "blocked" with H-acidic components. A proper selection of the "blocking agent" determines the reactivity, i.e. the splitting temperature of the blocked polyisocyanate and therefore the curing conditions of such an aliphatic, 1-component thermosetting polyurethane system. The following blocking agents are of commercial and technological interest: more important are 2-Butanone-oxime (methyl ethyl ketoxime, MEKO), ε-caprolactam and to a limited extend 3,5-dimethylpyrazole. In specific areas, especially in powder coatings, the uretdion/dimer structure is used to deactivate isocyanate groups thermally reversible without using blocking agents.

Temperatures between 120 and 250° C. are necessary to release the blocking groups which usually volatilize from the coating. The resulting polyisocyanates can react with other active hydrogen-containing compounds to form more thermally stable urethane or urea linkages. The dissociation temperatures of the labile bond of a blocked polyisocyanate depend on the structures of the polyisocyanates and the blocking groups utilized. Blocked polyisocyanates based on aromatic polyisocyanates dissociate at lower temperatures than those based on aliphatic ones. The dissociation temperatures of blocked polyisocyanates based on commercially utilized blocking agents decrease in this order: alcohols>ε-caprolactam>phenols>methyl ethyl ketoxime>active methylene compounds.

Blocked polyisocyanates can be used to cross-link both solventborne and waterborne resins. The blocked polyisocyanates offer wide formulation latitude. They can be added to the coreactant resins providing one-package coatings with excellent shelf life. These combinations result in cross-linked films within reasonable curing cycles. Coatings obtained show high-performance with the unique combination of high hardness and good flexibility. Coatings based on water-dispersible blocked polyisocyanate cross-linkers and suitable waterborne polymers approach the performance levels previously obtained only by solvent-borne coatings.

Suitable polyisocyanate precursors supplied by BAYER MATERIAL SCIENCE include:

| | |
|---|---|
| DESMODUR ® BL 100 | a blocked TDI-type crosslinking stoving urethane resin |
| DESMODUR ® BL 3175A | aliphatic blocked polyisocyanate based on hexamethylene diisocyanate (HDI); for light-stable, 1K baking systems with relatively low curing temperatures |
| DESMODUR ® BL 3272 MPA | aliphatic blocked polyisocyanate based on hexamethylene diisocyanate (HDI); hardener for lightfast one-pack baking polyurethane coatings |
| DESMODUR ® BL 3370 MPA | aliphatic blocked polyisocyanate based on hexamethylene diisocyanate (HDI); light-stable one-component baking polyurethane coatings with relatively low curing temps |

-continued

| | |
|---|---|
| DESMODUR ® BL 3475 BA/SN | aliphatic blocked polyisocyanate based on hexamethylene diisocyanate (HDI) and isophorone diisocyanate (IPDI); hardener for lightfast one-pack baking polyurethane coatings with a low baking temp |
| DESMODUR ® BL 4265 SN | aliphatic blocked polyisocyanate based on isophorone diisocyanate (IPDI); for light-stable, 1K baking polyurethane coating systems with relatively low curing temperatures |
| DESMODUR ® DA-L | hydrophylic aliphatic polyisocyanate adduct based on hexamethylene diisocyanate (HDI); solvent-free, water-dispersible crosslinking agent for aqueous polymeric dispersions |
| DESMODUR ® DN | hydrophylic aliphatic polyisocyanate adduct based on hexamethylene diisocyanate (HDI); lower viscosity grade; solvent-free, water-dispersible crosslinking agent for aqueous polymeric dispersions |
| DESMODUR ® E-14 | aromatic polyisocyanate; solvent-free linear aromatic prepolymer based on toluene diisocyanate (TDI) |
| DESMODUR ® E 23 A | aromatic polyisocyanate; solvent-free aromatic polyisocyanate prepolymer based on diphenylmethane diisocyanate (MDI) |
| DESMODUR ® E 28 | aromatic polyisocyanate prepolymer based on diphenylmethane diisocyanate (MDI) |
| DESMODUR ® E 210 | aromatic polyisocyanate; solvent-free aromatic prepolymer based on diphenylmethane diisocyanate (MDI) |
| DESMODUR ® E 743 | aromatic polyisocyanate prepolymer based on diphenylmethane diisocyanate (MDI |
| DESMODUR ® E 744 | aromatic polyisocyanate prepolymer based on diphenylmethane diisocyanate (MDI) |
| DESMODUR ® E 1160 MPA/X | aromatic polyisocyanate prepolymer based on toluene diisocyanate (TDI) |
| DESMODUR ® E-3265 | aliphatic polyisocyanate prepolymer based on hexamethylene diisocyanate (HDI); for moisture-curing 1K polyurethane coatings with good gloss retention |
| DESMODUR ® PL 340 | blocked aliphatic polyisocyanate based on isophorone diisocyanate (IPDI); for 1-pack polyurethane baking coatings |
| DESMODUR ® PL 350 | blocked aliphatic polyisocyanate based on hexamethylene diisocyanate (HDI); HDI trimer; for 1-pack polyurethane baking coatings |
| DESMODUR ® VP LS 2078 | blocked aliphatic polyisocyanate; blocked aliphatic crosslinking stoving urethane resin based on IPDI |
| DESMODUR ® VP LS 2117 | blocked aliphatic polyisocyanate based on HMDI; blocked aliphatic urethane stoving resin |
| DESMODUR ® VP LS 2253 | blocked aliphatic polyisocyanate based on hexamethylene diisocyanate (HDI); for light-stable, 1K baking systems with relatively low curing temperatures |
| DESMODUR ® VP LS 2371 | IPDI polyether prepolymer; for elastic coatings and surface sealer compounds |
| COLONATE ® AP* | a phenol blocked TDI prepolymer |
| ADESTER 200# | a blocked polyisocyanate |

*Nippon Polyurethane Industries
Mitsubishi Kasei Corp.

Polymer Films

The polymer film used in the method according to the present invention, is preferably a polyethylene, polyethylene terephthalate, PET, PVC or polycarbonate film.

The polymer film used in the method according to the present invention, is preferably a polymer foil. The polymer foil preferably has a thickness between about 5 µm and about 120 µm, more preferably between about 10 µm and about 60 µm, most preferably between about 10 µm and about 30 µm.

Suitable polymer films and foils which are laminated include cellulose acetate propionate or cellulose acetate butyrate, polyesters such as polyethylene terephthalate and polyethylene naphthalate, polyamides, polycarbonates, polyimides, polyolefins, poly(vinylacetals), polyethers and polysulphonamides.

In a preferred embodiment of the security document according to the present invention, the polymer film is polyvinyl chloride, polycarbonate or polyester. The polyester is preferably polyethylene terephthalate (PET) or polyethylene terephthalate glycol (PETG).

Security Documents

The security document according to the present invention is preferably an identification card selected from the group consisting of an identity card, a security card, a driver's license card, a social security card, a membership card, a time registration card, a bank card, a pay card and a credit card. In a preferred embodiment, the security document according to the present invention is a personal identity card.

Industrial Application

The process according to the present invention can be used for preparing security laminates which can be used in identity documents such as driver's licenses, ID-cards and passports, and on other important documents such as certificates of title. Security laminates are also useful as tamper proof seals on medications, video cassettes, and compact discs.

The invention is illustrated hereinafter by way of COMPARATIVE EXAMPLES and INVENTION EXAMPLES. The percentages and ratios given in these examples are by weight unless otherwise indicated.

MEK=methyl ethyl ketone
THF=tetrahydrofuran

The holograms used in the COMPARATIVE EXAMPLES and INVENTION EXAMPLES consisting of a 12 µm or 23 µm thick poly(ethylene terphthalate) support coated with an embossed ca. 5 µm thick embossable layer vacuum-coated with a ca. 100 nm thick layer of zinc sulphide, a HRI-material to produce holograms corresponding to the embossing are available from Centro Grafico, FASVER and OVD. The ca. 100 nm thick layer of zinc sulphide material applied by a vacuum technique such as vacuum evaporation or sputtering is amorphous and porous.

INVENTION EXAMPLES 1 TO 4 AND COMPARATIVE EXAMPLE 1

In INVENTION EXAMPLES 1 to 4 and COMPARATIVE EXAMPLES 2 and 3 a hologram as described above was mounted on a 23 µm thick poly(ethylene terephthalate) support. The outermost surface of the ca. 100 nm evaporated zinc sulphide layer was conditioned by spreading different organic liquids thereon using a Braive® coating apparatus with a wire-rod with a contact time of 200 s before the liquids evaporated and drying at 60° C. for 5 minutes and in COMPARATIVE EXAMPLE 1 no conditioning was performed.

An adhesive composition was prepared by mixing 50 g of Liofol UK 3640, a polyurethane solvent (ethyl acetate) adhesive, with 1 g of Hardener Liofol UK 6800 layer and this composition was applied using a Braive coating apparatus with a 10 µm wire-rod to the outermost surface of the foil of INVENTION EXAMPLES 1 to 4 conditioned with different organic liquids, COMPARATIVE EXAMPLE 1 without conditioning and COMPARATIVE EXAMPLES 1 and 2 with conditioning with organic liquids outside the scope of the present invention on the zinc sulphide-coated side of the support and was dried for 5 minutes at 50° C.

The adhesive layer-coated side of the foils was then laminated to the polyethylene side of an identity-card simulating transparent laminate consisting of a 500 µm PETG sheet which had been laminated with a 12 µm gelatin layer to a 35 µm thick polyethylene foil with a EXECELAM 655Q laminator (from GMP Co. Ltd, Korea) at a temperature of 160° C. at speed position 1.

The delamination resistance of the resulting laminates of INVENTION EXAMPLES 1 to 4 and COMPARATIVE EXAMPLES 1 to 3 was evaluated dry according to ISO/IEC 7810:1995 with an Instron in terms of peel strength. The dry peel strength values for the laminates were measured and the values given in Table 1.

The effect of the solvent conditioning and adhesive layer on the hologram brilliance was also assessed. There are no standard techniques for assessing the brilliance of holograms and therefore visual inspection in comparison with the uncoated hologram was the only option. The brilliance was assessed by awarding numerical scores according to the following criteria:

5=increased brilliance over that of the uncoated hologram
4=comparable brilliance to that of the uncoated hologram
3=noticeably lower brilliance than that of the uncoated hologram
2=substantially lower brilliance than that of the uncoated hologram
1=hologram disappeared The numerical scores for the laminates of INVENTION EXAMPLES 1 to 4 and COMPARATIVE EXAMPLES 1 to 3 are given in Table 1.

TABLE 1

| | | visual evaluation of hologram brilliance | | Peel | Peel |
|---|---|---|---|---|---|
| | organic liquid pre-treatment | prior to coating with adhesive composition | after lamination | strength dry [N/cm] | strength wet [N/cm] |
| Invention example nr | | | | | |
| 1 | MEK | 2 | 2 | >6 | >6 |
| 2 | ethyl acetate | 2 | 2 | >6 | >6 |
| 3 | THF | 2 | 2 | >6 | >6 |
| 4 | acetone | 2 | 2 | >6 | >6 |
| Comparative example nr | | | | | |
| 1 | | 4 | 3 | 4 | <1 |
| 2 | methanol | 3 | 3 | <6 | <6 |
| 3 | toluene | 3 | 3 | <6 | <6 |

The peel strength for the laminates of INVENTION EXAMPLE 1 to 4 with holograms conditioned with methylethylketone, ethyl acetate, tetrahydrofuran or acetone exceeded the target value of ≧6 N/cm for identification cards, but that for the laminate of COMPARATIVE EXAMPLE 1 with the uncoated hologram and those for the laminates of COMPARISON EXAMPLES 2 to 3 with toluene and methanol exhibited peel strengths well below the target value of ≧6 N/cm (the norm laid down in ISO 10373-1 is ≧3.5 N/cm). The peel strength of the wetted laminates of INVENTION EXAMPLES 1 to 4 also fulfilled the target value of ≧6 N/cm for identification cards.

The low brilliance observed is principally due to the brilliance lowering effect of the conditioning solvents and the long contact time. This effect can be reduced by reducing the contact time e.g. by applying a 3 µm thick solvent layer with a gravure roll the brilliance is increased to 3 without loss of adhesion or alternatively the conditioning solvent can be mixed with a non-conditioning solvent such as an alcohol or an aromatic solvent, thereby reducing the exposure of the HRI-layer to the brilliance-reducing methylethylketone.

The invention claimed is:

1. A method for interlaminating a transparent embossed hologram, said transparent embossed hologram comprising a support having two sides, at least one of the two sides either itself being embossed or having a layer thereon which is embossed and a layer of a HRI-material contiguous and coextensive with the embossed side or embossed layer, the method comprising the steps of:
 a) solvent conditioning the outermost surface of the layer of inorganic HRI-material with a solution consisting of at least one organic liquid;
 b) drying the outermost surface of the layer of the inorganic HRI-material thereby providing a conditioned outermost surface of the layer of inorganic HRI-material;
 c) applying an adhesive layer to the conditioned outermost surface; and
 d) laminating the outermost surface of inorganic HRI-material to an optionally transparent polymer film,
 wherein the at least one organic liquid is a solvent selected from the group consisting of ketones, ethers, heterocyclic ethers, lactams, amides, halo-aliphatic compounds, nitriles and esters; wherein at least one of the support and the polymer film is transparent; and wherein the HRI material is a material with a refractive index of at least 0.3 higher than that of the embossed material.

2. The method according to claim 1, wherein the support is transparent.

3. The method according to claim 2, wherein the polymer film is a polyethylene, polyethylene terephthalate, PVC or polycarbonate film.

4. The method according to claim 2, wherein the polymer film is a polymer foil having a thickness between 5 μm and 120 μm.

5. The method according to claim 2, wherein the adhesive layer is provided by a curable composition comprising a polymer having a plurality of hydroxy-groups and a curing agent selected from the group consisting of polyisocyanates, polyepoxides and hydrolysed polyalkoxysilanes.

6. The method according to claim 2, wherein the embossed layer has a refractive index within 0.2 of the refractive index of the support.

7. The method according to claim 2, wherein the adhesive layer between the support and the polymer film has a refractive index within 0.2 of the embossed layer.

8. The method according to claim 2, wherein the method further comprises the steps of: applying the adhesive layer to the outermost surface on the side of the support with the HRI-layer not above the embossed layer and laminating the transparent film to the adhesive layer so that the adhesive at least provides a seal around the transparent embossed hologram or holograms.

9. The method according to claim 2, wherein the lamination of the support to the polymer film has a strength of at least 6 N/cm$^2$ as measured according to ISO Norm 10373-1-1978.

10. The method according to claim 2, wherein the lamination of the conditional outermost layer to the polymer film has a strength of at least 6 N/cm$^2$ as measured according to ISO Norm 10373-1-1978.

11. A laminate obtained by the method according to claim 2.

12. A security document comprising a laminate obtained by the method according to claim 2.

13. The method according to claim 1, wherein the polymer film is a polyethylene, polyethylene terephthalate, PVC or polycarbonate film.

14. The method according to claim 1, wherein the polymer film is a polymer foil having a thickness between 5 μm and 120 μm.

15. The method according to claim 1, wherein the adhesive layer is provided by a curable composition comprising a polymer having a plurality of hydroxy-groups and a curing agent selected from the group consisting of polyisocyanates, polyepoxides and hydrolysed polyalkoxysilanes.

16. The method according to claim 1, wherein the embossed layer has a refractive index within 0.2 of the refractive index of the support.

17. The method according to claim 1, wherein the. adhesive layer between the support and the polymer film has a refractive index within 0.2 of the embossed layer.

18. The method according to claim 1, wherein the method further comprises the steps of: applying the adhesive layer to the outermost surface on the side of the support with the HRI-layer not above the embossed layer and laminating the transparent film to the adhesive layer so that the adhesive at least provides a seal around the transparent embossed hologram or holograms.

19. The method according to claim 1, wherein the lamination of the support to the polymer film has a strength of at least 6 N/cm$^2$ as measured according to ISO Norm 10373-1-1978.

20. The method according to claim 1, wherein the lamination of the conditioned outermost layer to the polymer film has a strength of at least 6 N/cm$^2$ as measured according to ISO Norm 10373-1-1978.

21. A laminate obtained by the method according to claim 1.

22. A security document comprising a laminate obtained by the method according to claim 1.

* * * * *